US006572799B2

(12) United States Patent
Radzio, Jr. et al.

(10) Patent No.: US 6,572,799 B2
(45) **Date of Patent: *Jun. 3, 2003**

(54) METHOD OF RELEASING PRESSURE IN NON-METALLIC INJECTION MOLDS

(75) Inventors: Carl E. Radzio, Jr., Brockport, NY (US); Richard C. Benson, Rochester, NY (US); Robyn S. Chaddock, Elba, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/453,328

(22) Filed: Dec. 2, 1999

(65) Prior Publication Data

US 2003/0001300 A1 Jan. 2, 2003

(51) Int. Cl.[7] ..................... B29C 45/76

(52) U.S. Cl. ................ 264/40.5; 264/328.1; 264/328.7; 264/328.8; 425/812

(58) Field of Search ..................... 264/40.5, 328.1, 264/328.7, 328.8; 425/149, 151, 218, 577, 812; 249/141

(56) References Cited

U.S. PATENT DOCUMENTS

| | | | | | |
|---|---|---|---|---|---|
| 3,670,066 | A | * | 6/1972 | Valyi | 264/148 |
| 4,342,717 | A | * | 8/1982 | Gardner | 264/328.8 |
| 4,540,534 | A | * | 9/1985 | Grendol | 264/2.2 |
| 5,147,658 | A | * | 9/1992 | Furukawa et al. | 425/127 |
| 5,156,754 | A | * | 10/1992 | Nomura et al. | 249/134 |
| 5,350,288 | A | | 9/1994 | Kimoto et al. | 425/136 |

* cited by examiner

*Primary Examiner*—Jan H. Silbaugh
*Assistant Examiner*—Donald Heckenberg

(57) ABSTRACT

A method of releasing pressure in a non-metallic injection mold has a pressure relief valve positioned in the molten resin flow path for handling excess resin pressure. The pressure relief valve responds to excess resin pressure in the cavity by providing an alternate resin flow path for the pressurized excess resin.

3 Claims, 3 Drawing Sheets

METHOD OF RELEASING PRESSURE IN NON-METALLIC INJECTION MOLDS

CROSS-REFERENCE TO RELATED APPLICATIONS

The present application is related to U.S. application Ser. No. 09/452,930, filed Dec. 2, 1999, by Radzio, et al., and entitled, "Injection Molding Apparatus For A Non-Metallic Injection Mold," and U.S. application Ser. No. 09/453,760, filed Dec. 2, 1999, by Radzio, et al., and entitled, "Pressure Relief Valve For Non-Metallic Injection Molds," now abandoned.

FIELD OF THE INVENTION

The invention relates generally to the field of injection molding. More particularly, the invention concerns an injection molding method having a pressure relief valve that provides an alternate resin passage for excess molten resin under a predetermined pressure in a non-metallic injection mold.

BACKGROUND OF THE INVENTION

Cost reductions in low to mid volume injection molding operations has led to the use of one piece case epoxy molds as an alternative to more expensive steel or aluminum tooling. Several have developed techniques to produce production injection molded parts using these cast epoxy molds. The epoxy molds are cast as a single piece for each half of the mold as opposed to hard tooling that is machined out of steel or aluminum. The main limiting factor of the epoxy mold is its inability to withstand the normal cavity pressures created within a conventional mold. Epoxy molds will only tolerate 10%–15% of the pressure that a steel or aluminum mold will tolerate. But they still require adequate pressure during injection and packing to produce an acceptable part. If cavity pressure should spike during injection or pack, the epoxy mold will fail catastrophically. This means that one half, or in some cases both halves, of the mold will split into pieces, effectively destroying the mold.

It is our experience that epoxy injection molds for molding low to mid volume production parts need protection against catastrophic failure. The method and apparatus for protecting these molds needs to be simple, adjustable for different molding resins, specific to each mold so that the mold is protected in any molding machine, and the method and apparatus needs to reset itself automatically whenever it is actuated to protect the mold. Several known attempts have been made to resolve these problems unique to non-metallic molds but most were rejected because of cost and the problem of modifying all the different molding machines that these molds can run in.

In U.S. Pat. No. 5,350,288, Sep. 27, 1994, by Kimoto et al, entitled Injection Molding Unit, an injection molding unit is disclosed that uses a pressure relief valve in a conventional metallic (steel) mold. A major shortcoming of the aforementioned valve arrangement is that if the relief valve operates and releases excess melt pressure from the mold, the mold and/or relief valve assembly will have to be disassembled to remove the solidified plastic material. Moreover, the relief valve operates as a part of the injection molding machine without any obvious means of adjusting the pressure.

Therefore, a need persists in the art for an injection molding method having a non-metallic mold that resists catastrophic failure under high molten resin pressure.

SUMMARY OF THE INVENTION

An object of the present invention is to provide a method of releasing pressure in an injection molding apparatus having a non-metallic injection mold for molding low to medium volume production parts without catastrophic failures.

Another object of the invention is to provide a method using an adjustable pressure relief valve that can be set at a predetermined value for accommodating molten resins having different flow characteristics.

It is another object of the invention to provide a method using an alternate flow path for accommodating excess molten resin produced by excess resin pressure.

It is a feature of the invention that a method for releasing pressure uses a pressure relief valve associated with the molding apparatus for providing excess molten resin access to the alternate molten resin flow passage when the pressure in the molten resin passage is beyond a predetermined value.

To achieve one or more of the above objects, features and advantages of the invention, there is provided in one aspect of the invention, a method of releasing pressure in an injection mold having a non-metallic mold and a first, molten resin flow path for receiving a molten resin, comprising the steps of:

- providing a pressure relief valve having an outwardly extending, axially movable, biased pin member;
- forming a second molten resin flow path in an adjacent structure associated with said pressure relief valve for excess resin flow away from said non-metallic mold for use when pressure in said first molten resin flow path exceeds a predetermined value, said alternate molten resin flow path being configurable for fluid communications with said first molten resin flow path;
- positioning said axially movable, biased pin member at a terminal end of the first molten resin flow path so as to block the flow of resin beyond said terminal end; and,
- ejecting a molten resin through said molten resin flow path of said non-metallic mold such that any excess molten resin in said molten resin flow path creates excess pressure on said pin member of said pressure relief valve thereby causing said biased pin member to retract away from said terminal end of said first molten resin flow path and then open said excess molten resin to fluid communications with said alternate resin flow path.

The method of the invention, therefore, has numerous advantageous effects over currently existing developments, including: parts can be molded in an epoxy injection mold without the prospects of mold failure; the pressure relief valve is adjustable for different resins (for instance PC requires a heavier spring and less adjustment pre-load than HIPS); the pressure relief valve is specific to the mold, i.e., once it is set up properly and adjusted for a specific resin, it operates to protect the mold in any molding machine that one might use; the pressure relief valve resets itself automatically after it actuates; and, any part molded when the pressure relief valve actuates will eject from the mold with the resin from the escape channel attached.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
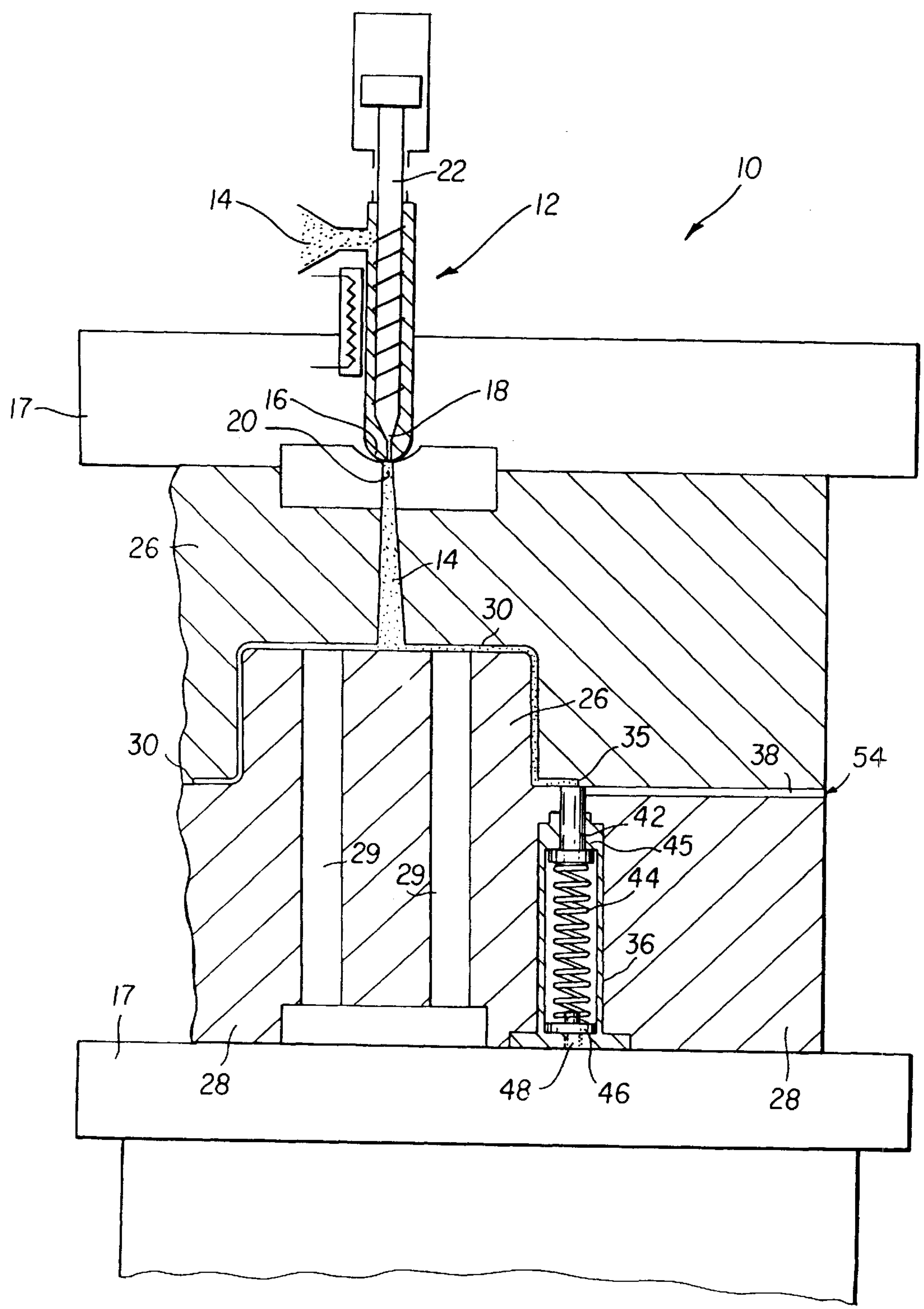
FIG. 1 is a cross-section view of a typical injection molding machine.
Figure 2:
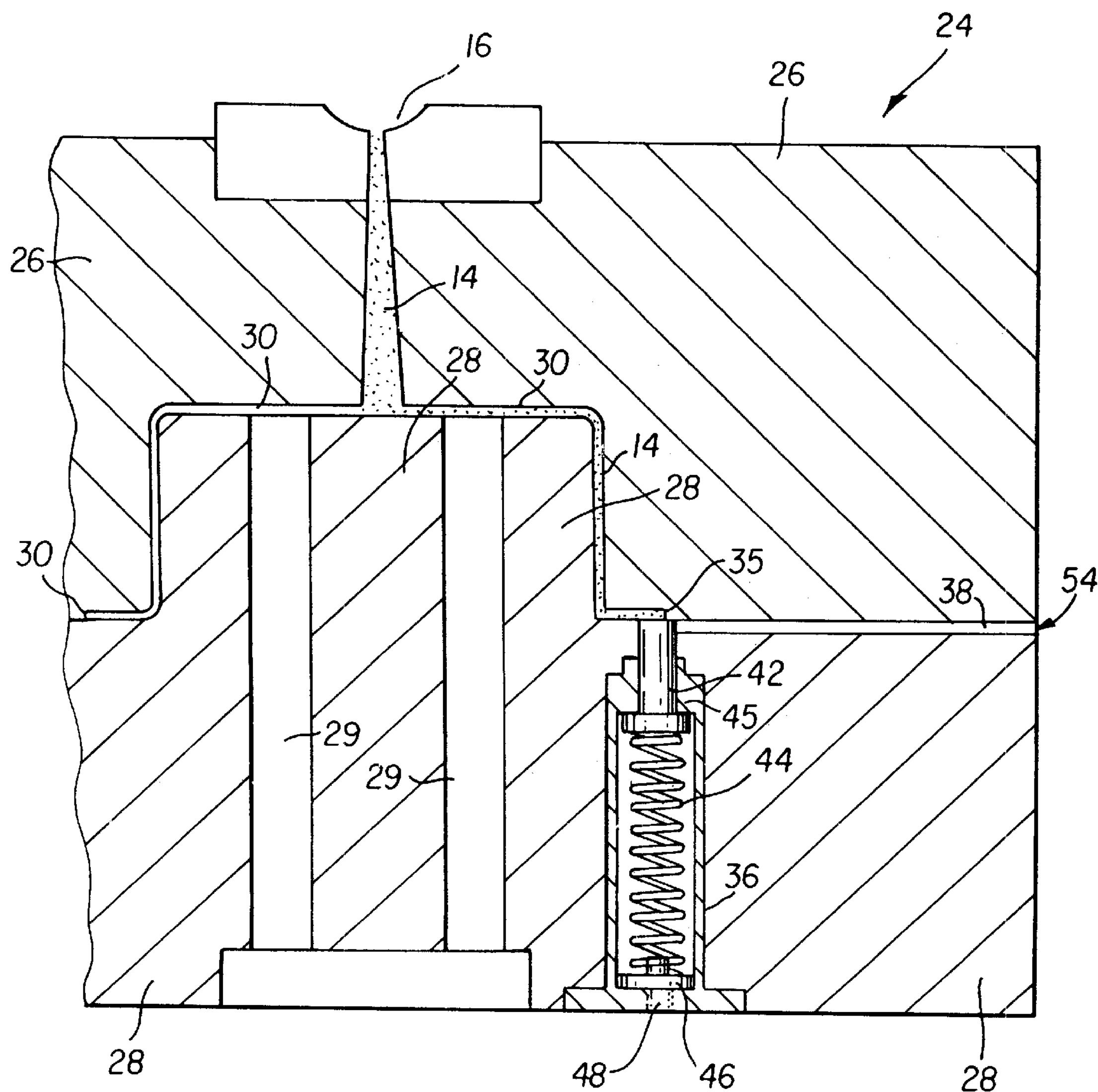
FIG. 2 is a cross section of the injection molding apparatus of the invention having the pressure relief valve in a molten resin blocking position.
Figure 3:
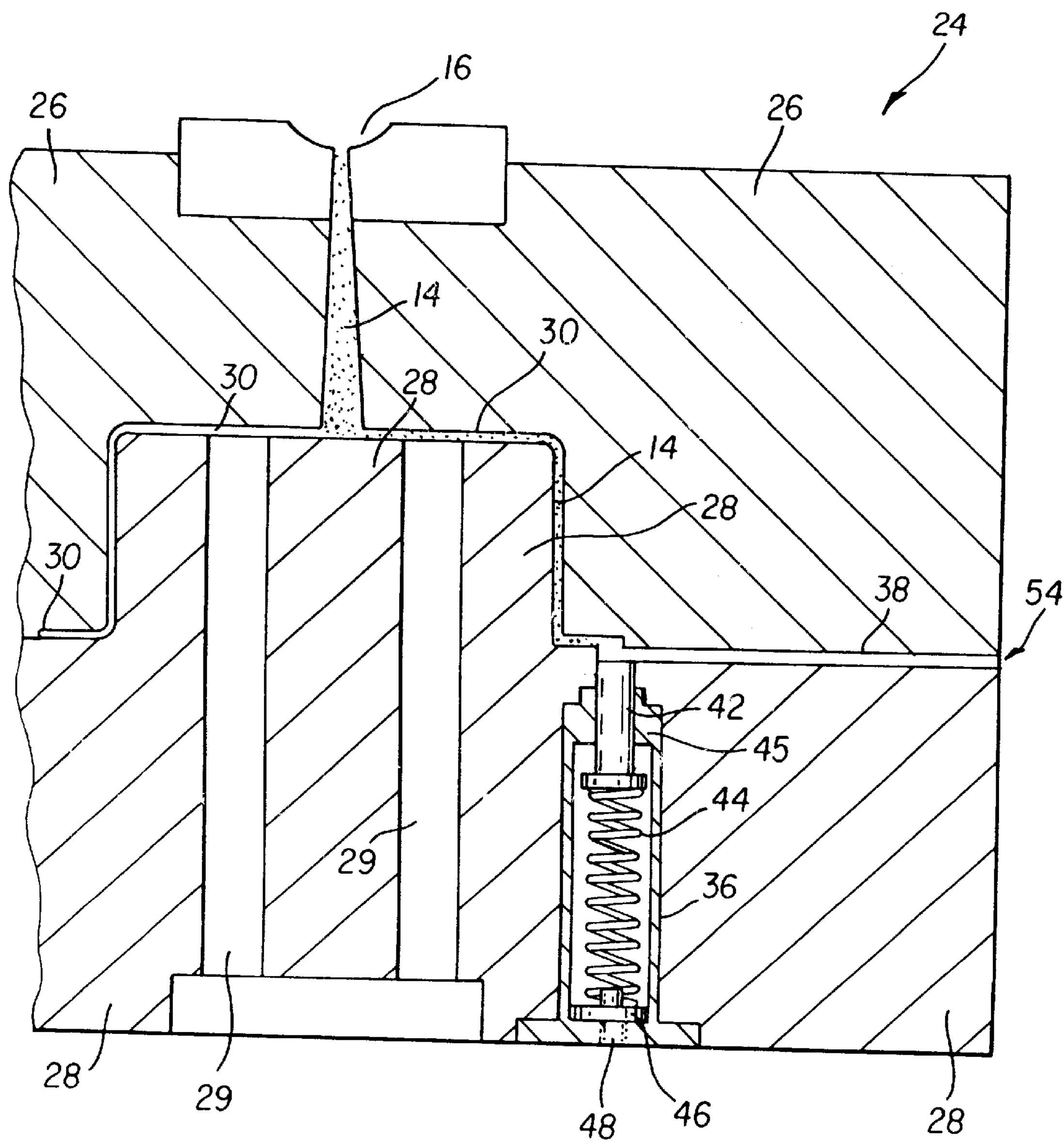
FIG. 3 is a cross-section of the injection molding apparatus of the invention having the pressure relief valve in a molten resin unblocking position.

Turning now to the drawings, and in particular to FIGS. 1–3, an injection molding apparatus 10 is illustrated. Broadly defined, according to FIG. 1, injection molding apparatus 10 has an injection molding machine 12 for injecting molten resin 14. Skilled artisans will appreciate that injection molding machine 12 has a platen 17 supporting a screw cylinder 16 having a tip 18, a nozzle 20 at the tip 18 and a screw 22 advanceable in the screw cylinder 16 for injecting molten resin 14 from the nozzle 20.

According to FIGS. 2–3, the injection molding apparatus 10 of the present invention has a non-metallic injection mold 24 for molding a part (not shown). Non-metallic injection mold 24 comprises a stationary cavity mold 26 and a movable core mold 28 forming a hollow or first molten resin flow path 30 therebetween for forming an injection molded product therein. Core mold 28 is movable by ejector pins 29 arranged in mold 24 for forceably separating the hollow 30 from the core mold 28. Non-metallic injection mold 24 may include various materials such as thermoset materials as well as cast epoxy, stereo lithography urethane and silicone. In the preferred embodiment, the injection mold 24 is constructed of cast epoxy.

Referring to FIG. 2, hollow or first molten resin flow path 30 extends from the screw cylinder 16 to a terminal end 35 of the hollow 30. A pressure relief valve 36 is located on the hollow or first molten resin flow path 30 at the terminal end 35 of the hollow 30. Pressure relief valve 36 is adapted to release the molten resin 14 from the first molten resin flow path 30 when the pressure of the molten resin 14 exceeds a predetermined level or value, further discussed below.

In FIG. 2, more particularly, pressure relief valve 36 is shown in a first position blocking molten resin flow beyond the terminal end 35 of the first molten resin flow path 30. In this position, molten resin 14 is retained in the hollow or first molten resin flow path 30 by the pressure of movable pin 42. The pressure of the molten resin 14 in this position is generally less than a predetermined value determined by the strength of a spring bias 44 (described below) biasing movable pin 42.

Referring to FIG. 3, pressure relief valve 36 is shown in a second position unblocking the excess molten resin 14 in the hollow or first molten resin flow path 30 thereby enabling the excess molten resin 14 to flow into a second molten resin flow path 38 beyond the first molten resin flow path 30. In this configuration, the first molten resin flow path or hollow 30 is in fluid communications with the second molten resin flow path 38. As depicted in FIGS. 2–3, the pressure relief valve 36 has preferably a cylindrically shaped body with a movable pin 42 arranged for axial movements in one end 45. A spring bias 44 is disposed between the movable pin 42 and a base plate 46 that affixes the spring bias 44 under the movable pin 42 in a biasing relations. In the preferred embodiment, an adjustment screw 48 is arranged in the base plate 46 for applying the pre-load to the spring bias 44. Preferably, the entire pressure relief valve 36 is cast into the movable core mold 28 of an epoxy injection mold so that the movable pin 42 extends through the parting line 54 to shut off the second molten resin flow path 38. The novel and unobvious design of the second molten resin flow path 38 on the surface of the parting line 54 allows the vented molten resin 14 to come out of the mold 24 with the part and then allows the pressure relief valve 36 to reset automatically. Skilled artisans will appreciate that pressure relief valve 36 may also be cast in the stationary cavity mold 26 of the mold 24.

Referring to FIGS. 2–3, pressure relief valve 36 for epoxy injection molds 24 is adjustable by one of two ways. First, the adjustment screw 48 may be adjusted to apply more or less resistance on spring bias 44. Second, the spring bias 44 may be selected having a pre-selected strength, as discussed further below. Although either means of adjusting pressure relief valve 36 has advantages over the other, we generally prefer adjusting the adjustment screw 48 to affect the resistance of the spring bias 44 that governs the movements of movable pin 42.

Referring again to FIGS. 2–3, pressure relief valve 36 is actuated directly by the pressurized, molten resin 14 in the cavity mold 26. As indicated above, movable pin 42 in the pressure relief valve 36 shuts off the resin escape channel or second molten resin flow path 38 under a predetermined pressure and is held in place by the spring bias 44. When the cavity pressure exceeds the predetermined pressure limit the movable pin 42 pushes back against the spring bias 44 and allows the excess resin and pressure to escape the mold 24 through the second molten resin flow path 38 or escape channel. Not only does this vent the molten resin 14 out of the hollow 30, but it also reduces the pressure in the cavity mold 26 below the cavity mold failure point. After the part cures (cools) in the mold 24, the mold 24 opens and the part is ejected automatically. The molten resin 14 that flowed into the escape channel or second molten resin flow path 38 is ejected along with the part and the movable pin 42 resets itself automatically, shutting off the second molten resin flow path 38.

We have demonstrated that the test epoxy mold 24 can successfully vent excess molten resin pressure before the cavity mold 26 fails. We were able to accommodate different materials that require different pressures of cavity mold 26 by changing the spring bias 44 in the pressure relief valve 36 and/or adjusting the pre-load on the spring bias 44, as described.

An example of the process for selecting the proper strength spring bias 44 and pre-load adjustment for the cavity mold 26 and molten resin 14 is illustrated in Table 1. According to Table 1, the amount of pressure in the cavity mold 26 appeared fairly constant as a function of the spring bias 44 between minimum and maximum settings. Thus, one can select the appropriate spring type to enable ejection molding in the mold 24 at a certain pressure.

TABLE 1

| SPRING | SETTING MIN/MAX | HOLD PRESS? YES/NO | PIN TRAVEL | CAVITY PRESS. (psi) |
|---|---|---|---|---|
| Blue - LIGHT | Min | No | 0.060 | |
| | Half | Yes | 0.028 | 875 |
| | Max | Yes | 0.018 | 875 |

TABLE 1-continued

| SPRING | SETTING MIN/MAX | HOLD PRESS? YES/NO | PIN TRAVEL | CAVITY PRESS. (psi) |
|---|---|---|---|---|
| Orange | Min | Yes | 0.050 | 1750 |
| | Half | Yes | 0.025 | 1750 |
| | Max | Yes | 0.015 | 1750 |
| Blue - HEAVY | Min | Yes | 0.025 | 2000 |
| | Half | Yes | 0.012 | 2000 |
| | Max | Unsafe conditions | | |

PARTS LIST

| | |
|---|---|
| 10 | injection molding apparatus |
| 12 | injection molding machine |
| 14 | molten resin |
| 16 | screw cylinder |
| 17 | platen |
| 18 | tip |
| 20 | nozzle |
| 22 | screw |
| 24 | non-metallic injection mold |
| 26 | stationary cavity mold |
| 28 | movable core mold |
| 29 | ejector pins |
| 30 | hollow or first molten resin flow path |
| 35 | terminal end of the hollow 30 |
| 36 | pressure relief valve |
| 38 | second molten resin flow path |
| 42 | movable pin |
| 44 | spring bias |
| 45 | one end of pressure relief valve 36 |
| 46 | base plate |
| 48 | adjustment screw |
| 54 | parting line |

What is claimed is:

1. A method of releasing pressure in an injection mold having a non-metallic mold and a first molten resin flow path for receiving a molten resin, comprising the steps of:

providing an adjustable pressure relief valve having an outwardly extending, axially movable, biased pin member;

adjusting said adjustable pressure relief valve to accommodate a first molding resin at a first molding cavity pressure;

forming a second molten resin flow path in an adjacent structure associated with said pressure relief valve for excess resin flow away from said non-metallic mold for use when pressure in said first molten resin flow path exceeds a predetermined value, said second molten resin flow path being configurable for fluid communications with said first molten resin flow path;

positioning said axially movable, biased pin member at a terminal end of said first molten resin flow path so as to block the flow of said first molten resin beyond said terminal end when said pin member is in an engaged state; and, releasing said first molten resin through said molten resin flow path of said non-metallic mold such that any excess molten resin in said first molten resin flow path creates excess pressure on said pin member of said pressure relief valve thereby causing said biased pin member to displace to a retracted state away from said terminal end of said first molten resin flow path and then open said excess molten resin to fluid communications with said second molten resin flow path; and, adjusting the adjustable pressure relief valve to accommodate a second molding resin at a second molding cavity pressure.

2. The method recited in claim 1 wherein the step of adjusting pressure of said adjustable pressure relief valve comprises the step of changing a spring bias member supporting said biased pin member for axial movement under pressure.

3. The method recited in claim 1 wherein the step of adjusting pressure of said biased pin member comprises adjusting an adjustment screw securing said biased pin member in said pressure relief valve.

* * * * *

UNITED STATES PATENT AND TRADEMARK OFFICE

CERTIFICATE OF CORRECTION

PATENT NO. : 6,572,799 B2
DATED : June 3, 2003
INVENTOR(S) : Radzio, Jr et al.

It is certified that error appears in the above-identified patent and that said Letters Patent is hereby corrected as shown below:

Title page,
Please insert the following:
-- [74] *Attorney, Agent, or Firm,* Clyde E. Bailey, Sr. --

Signed and Sealed this

Twenty-ninth Day of June, 2004

JON W. DUDAS
*Acting Director of the United States Patent and Trademark Office*